(12) United States Patent
Kim et al.

(10) Patent No.: US 12,297,144 B2
(45) Date of Patent: May 13, 2025

(54) CLOSED-LOOP OPTICAL SEGMENT FUSING

(71) Applicant: Arizona Board of Regents on Behalf of the University of Arizona, Tucson, AZ (US)

(72) Inventors: Dae Wook Kim, Tucson, AZ (US); Heejoo Choi, Tucson, AZ (US); Marcos Esparza, Tucson, AZ (US)

(73) Assignee: Arizona Board of Regents on Behalf of the University of Arizona, Tucson, AZ (US)

( * ) Notice: Subject to any disclaimer, the term of this patent is extended or adjusted under 35 U.S.C. 154(b) by 715 days.

(21) Appl. No.: 17/404,967

(22) Filed: Aug. 17, 2021

(65) Prior Publication Data

US 2022/0055945 A1   Feb. 24, 2022

Related U.S. Application Data

(60) Provisional application No. 63/068,626, filed on Aug. 21, 2020.

(51) Int. Cl.
*B32B 41/00* (2006.01)
*B29C 65/00* (2006.01)
(Continued)

(52) U.S. Cl.
CPC .......... *C03C 27/10* (2013.01); *B29C 65/7802* (2013.01); *B29C 66/9261* (2013.01);
(Continued)

(58) Field of Classification Search
CPC ....... C03C 27/10; C03C 8/00; B29C 65/7802; B29C 66/9261; B29C 66/961;
(Continued)

(56) References Cited

U.S. PATENT DOCUMENTS

| 5,353,231 A * | 10/1994 | Sasaki | G02B 26/06 |
| | | | D16/132 |
| 2015/0104563 A1* | 4/2015 | Lowe | G01N 21/8806 |
| | | | 250/341.1 |

OTHER PUBLICATIONS

Apai, Daniel, et al., "A Thousand Earths: A Very Large Aperture, Ultralight Space Telescope Array for Atmospheric Biosignature Surveys," The Astronomical Journal 158(2), 83, 2019, 28 pages.
(Continued)

*Primary Examiner* — Michael N Orlando
*Assistant Examiner* — Joshel Rivera
(74) *Attorney, Agent, or Firm* — Perkins Coie

(57) ABSTRACT

Methods, apparatus and systems are described that relate to in-situ and in-process assembly of segmented optical component with high accuracy. One example method for assembling an optical component with multiple segments includes positioning the multiple segments to an initial state conforming to an alignment or positioning requirement, measuring positions of the multiple segments at the initial state, initiating a fusing process to fuse the multiple segments of the optical element together, measuring the positions of the multiple segments after commencement of the fusing process, and determining whether a change in the positions of the multiple segments has occurred that causes a deviation from the initial state. Upon a determination that the deviation is not within a tolerance value, the method includes adjusting a position of at least one of the multiple segments to maintain the deviation within the tolerance value.

12 Claims, 9 Drawing Sheets

(51) Int. Cl.
  B29C 65/78 (2006.01)
  C03C 8/00 (2006.01)
  C03C 27/10 (2006.01)
  G02B 23/02 (2006.01)
  B29C 65/48 (2006.01)
  B29D 11/00 (2006.01)
(52) U.S. Cl.
  CPC .............. B29C 66/961 (2013.01); C03C 8/00 (2013.01); G02B 23/02 (2013.01); *B29C 65/48* (2013.01); *B29C 65/78* (2013.01); *B29C 66/114* (2013.01); *B29D 11/00403* (2013.01); *B32B 2041/04* (2013.01)
(58) Field of Classification Search
  CPC ....... B29C 65/48; B29C 65/78; B29C 66/114; G02B 23/02; B29D 11/00403; B32B 2041/04
  USPC .................... 156/60, 64, 350, 351, 378, 379
  See application file for complete search history.

(56) References Cited

OTHER PUBLICATIONS

Apai, Daniel, et al., "Nautilus Observatory: a space telescope array based on very large aperture ultralight diffractive optical elements," Proc. SPIE 11116, Astronomical Optics: Design, Manufacture, and Test of Space and Ground Systems II, 2019, 11 pages.

Atcheson, Paul, et al., "MOIRE: ground demonstration of a large aperture diffractive transmissive telescope," Proc. SPIE 9143, Space Telescopes and Instrumentation 2014: Optical, Infrared, and Millimeter Wave, 2014, 16 pages.

Choi, H., et al., "Simultaneous angular alignment of segmented mirrors using sinusoidal pattern analysis," Optical System Alignment, Tolerancing, and Verification XI, vol. 10377, p. 103770G, International Society for Optics and Photonics, 2017, 7 pages.

Choi, Heejoo, et al., "In-progress metrology for multiple segmented optics for fusing process," Wyant College of Optical Sciences, University of Arizona, pp. 1-8.

Choi, Heejoo, et al., "Simultaneous multi-segmented mirror orientation test system using a digital aperture based on sheared Fourier analysis," Optics Express, 25(15), 18152-18164, 2017.

Hyde, Roderick A., "Eyeglass. 1. Very large aperture diffractive telescopes," Applied Optics 38 (19), 4198-4212, 1999, 15 pages.

Hyde, Roderick, et al., "Eyeglass: A Very Large Aperture Diffractive Space Telescope," Highly Innovative Space Telescope Concepts 4849, 28-39, 2002, 13 pages.

Milster, Tom D. et al., "Multiple-Order Diffractive Engineered Surface (MODE) Lenses," Applied Optics vol. 59(26), 2020, 7 pages.

\* cited by examiner

CLOSED-LOOP OPTICAL SEGMENT FUSING

CROSS REFERENCE TO RELATED APPLICATIONS

This application claims priority to the provisional application with Ser. No. 63/068,626, titled "CLOSED-LOOP OPTICAL SEGMENT FUSING," filed Aug. 21, 2020. The entire contents of the above noted provisional application is incorporated by reference as part of the disclosure of this document.

TECHNICAL FIELD

This patent document relates to techniques for the construction of large optical components using multiple smaller optical segments.

BACKGROUND

Powerful telescope design is driving the limits of astronomical sciences. The large diameter aperture of a telescope in visible-near infrared observation is a key parameter that determines spatial resolution as well as the amount of light collected from the object under observation. Fabrication of large optical elements, especially in space missions, has been developing slowly due to the difficult processes of fabrication, alignment, and launch.

SUMMARY

The disclosed embodiments relate to devices, systems and methods for improving the manufacturing of optical devices that are constructed from multiple optical segments. The larger optical component may be formed by fusing, gluing, or otherwise attaching multiple optical segments together.

One example system for constructing an optical component comprising multiple segments includes a positioning subsystem configured to position the multiple segments of the optical component to an initial state that conforms to a predetermined alignment or positioning requirement. The system includes a fusing subsystem configured to carry out a fusing process to fuse the multiple segments together. The system includes a monitoring and measurement subsystem comprising at least a camera configured to monitor positions of one or more of the multiple segments prior to commencement of the fusing process and during the fusing process. The system also includes a control subsystem configured to (1) receive information from the monitoring and measurement system to determine whether or not a change in the positions of the multiple segments has occurred that causes a deviation from the initial state within a particular tolerance value, and (2) provide control signals to one or both of the fusing subsystem and the positioning subsystem to adjust, upon a determination that the deviation is not within the particular tolerance value, a position of at least one of the multiple segments to maintain the deviation within the particular tolerance value.

An example method for assembling an optical component comprising multiple segments includes (a) positioning the multiple segments of the optical element to an initial state that conforms to a predetermined alignment or positioning requirement, (b) measuring positions of one or more of the multiple segments when the one or more optical segments are positioned at the initial state, (c) initiating a fusing process to fuse the multiple segments of the optical element together, (d) measuring the positions of one or more of the multiple segments subsequent to commencement of the fusing process, (e) determining whether or not a change in the positions of the multiple segments has occurred that causes a deviation from the initial state within a particular tolerance value of the predetermined alignment or positioning requirement, and (f) upon a determination that the deviation is not within the particular tolerance value, adjusting a position of at least one of the one or more the multiple segments to maintain the deviation within the particular tolerance value. Operations (d) through (f) are repeated until the fusing process is completed.

These, and other, aspects are described in the present document.

DETAILED DESCRIPTION

The large diameter aperture of a telescope in visible-near IR observation is one of the key parameters that determines spatial resolution as well as the amount of light collected from the object under observation. Large telescope fabrication, especially in space missions, has been developing slowly due to the difficult processes of fabrication, alignment, and launch. Instead of adopting a large monolithic primary optics section, using segmented primary optical components is an attractive approach. For example, for the Nautilus Space mission, an ultra-lightweight multi-order diffractive engineered (MODE) lens that includes multiple, identical, molded segments is used to replace bulky primary mirrors. Using multiple segments that are subsequently fused together reduces the difficulty of manufacturing complex diffractive surfaces. The fusing approach for segmented optics also allows for a cost-efficient process. However, the co-phasing and/or fusion process to achieve similar performance metrics as a monolithic optical section requires high precision metrology and orientation control. Proper control of the assembly and bonding process is required to ensure optimal performance of the telescope.

In existing systems and techniques, the process of constructing the larger optical component entails positioning the plurality of optical segment in proper positions, adjusting the segments as needed to obtain the proper alignment, and commencing the fusing process. However, the fusing of segmented optics demands high precision metrology and a delicate assembly strategy, and the optical segments can move or otherwise lose their proper alignment during the fusing process. This patent document discloses techniques that, among other features and benefits, can mitigate post-assembly process complications based on closed-loop feedback during the fusing process. The disclosed techniques can be used to provide in situ and in-process monitoring and correction of the positioning of the optical segments during the fusing process to ensure proper conformance of the optical segments to the desired characteristics such as proper alignment among a plurality of segments. In some embodiments, the fusing process is adjusted based on continuous or discrete feedback received from monitoring devices that trigger a temporary halt or a change in the fusing process until the position of the optical segments are adjusted. The disclosed systems can operate in a fully automatic fashion, where the fusing process is automatically adjusted, and actuators translate or rotate the optical segments responsive to control signals that are generated based on feedback received from the monitoring devices.

Figure 1A:
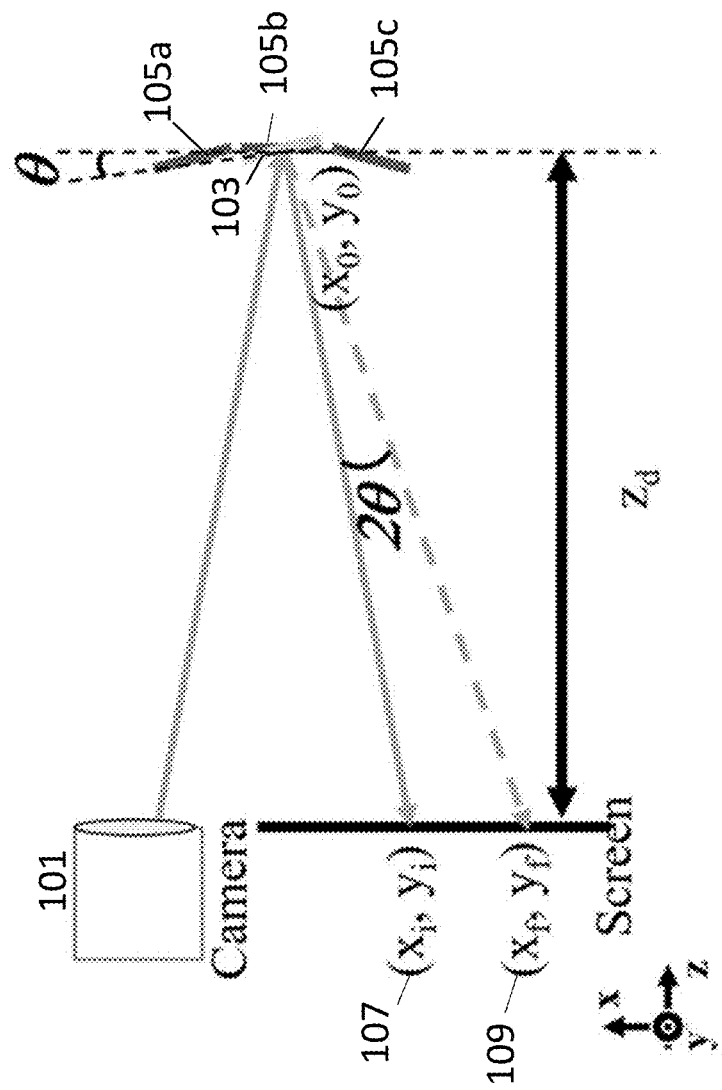
FIG. 1A illustrates a schematic diagram of an example metrology setup for monitoring alignments of optical components that can be used in the disclosed embodiments.
Figure 1B:
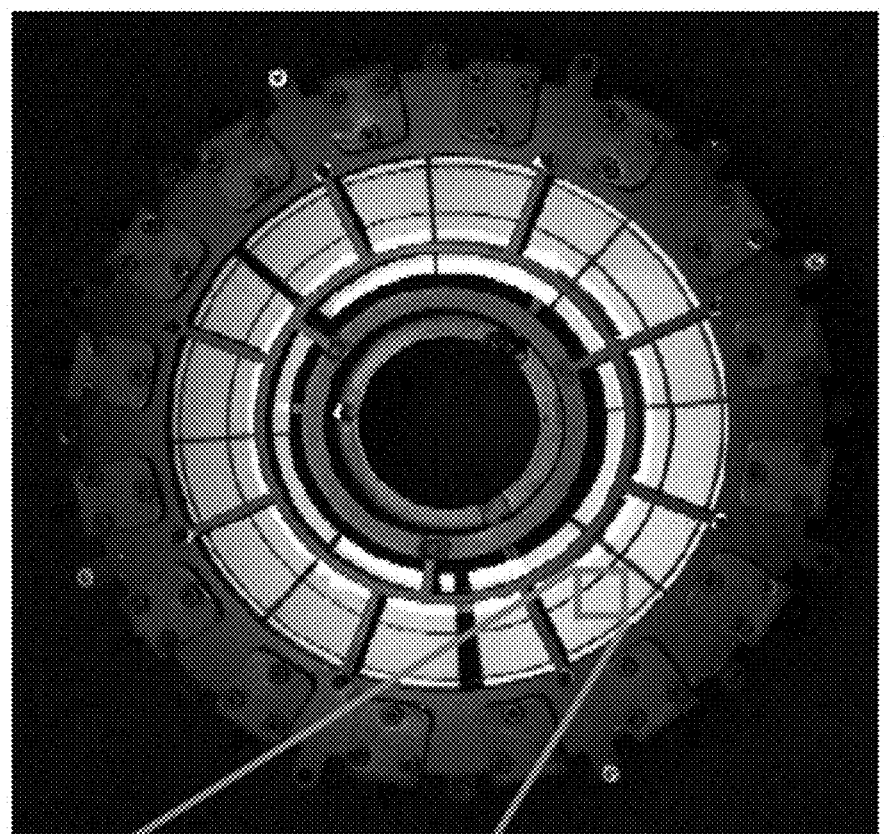
FIG. 1B illustrates example raw image of a unit under test (UUT) and measured two-dimensional (2D) sinusoidal pattern using the example metrology setup shown in FIG. 1A.

FIG. 1A illustrates a schematic diagram of an example metrology setup 100 for monitoring alignment of optical components that can be used in the disclosed embodiments. In this particular example, the optical component is a multi-segmented mirror and the system is configured to measure the orientation of the components. The camera 101 images a pattern that is displayed on the monitor screen 103 through the reflected light that it receives from the unit under test (UUT) (e.g., the multi-segmented mirror 105a, 105b, 105c). The camera and the screen are both positioned at a distance ($Z_d$) from the UUT. FIG. 1B illustrates example raw image of UUT multiple 16 larger segments that are positioned around a central circle within a holder, and the measured two-dimensional (2D) sinusoidal pattern in the inset. Referring back to FIG. 1A, the mirror angle change (θ) induces an angle deviation (2θ) that can be calculated from the shifted sinusoidal pattern on camera images. the initial images 107 of the pattern (e.g., sinusoidal images) that reflect off the UUT surfaces are taken in the first iteration. This iteration corresponds to the proper alignment or positioning of the segments before the fusing process has started. Then, the metrology system 100 continuously compares the refreshed images 109 against the initial images 107 during the fusing process. The variation of the UUT orientation introduces a linearly shifted sinusoidal pattern in the captured images. The tilted angle is extracted using Fast Fourier Transform (FFT) sheared pattern analysis.

The sheared pattern is obtained by subtracting the reference (e.g., initial) image from the refreshed image. Because it subtracts the same sinusoidal pattern with little phase shifting, the FFT results of sheared data show smaller amplitude at the target (e.g., initial) frequency. The amplitude variation can be translated to tilt angle using the below relationships. The variable x represents length on the screen in meters, the transform variable f represents frequency (in m$^{-1}$), and Δ represents the shift when the mirror is moved. Initial Pattern Frequency Bin:

$$FT(f(x)) = F(f) \qquad \text{Eq. (1)}$$

Shifted Pattern Frequency Bin:

$$FT(f(x+\Delta)) = e^{-i2\pi f \Delta} F(f) \qquad \text{Eq. (2)}$$

Sheared Pattern Frequency Bin:

$$FT[f(x+\Delta)-f(x)] = FT(f(x+\Delta)) - FT(f(x)) = (e^{-i2\pi f \Delta}-1)F(f) \qquad \text{Eq. (3)}$$

The Shifted Phase Δ:

$$\Delta = \frac{1}{2\pi f}\left[1 - \frac{1}{2}\left(\frac{[FT(f(x+\Delta)) - FT(f(x))]^2}{F(f)^2}\right)\right] \qquad \text{Eq. (4)}$$

The phase Δ dimension in Eq. (4) correspond to the x-axis (in FIG. 1A), and it translates to the position of $x_f$, by Eq. (5). The $x_i$ is the initial (e.g., reference) position where the camera looks at the screen through the UUT.

$$x_f = x_i + \text{Pixel pitch in physical units} \times \text{Number of pixels for one period} \times \text{shifted phase } (\Delta) \qquad \text{Eq. (5)}$$

The tilt angle θ then can be calculated by $$\theta = \frac{1}{2}\left(\left(\frac{(x_i - x_0)}{z_d}\right) - \left(\frac{(x_f - x_0)}{z_d}\right)\right) \qquad \text{Eq. (6)}$$

where $z_d$ is the distance between the UUT and the screen and $x_0$ is the center of UUT on the x-axis.

This technique represents one convenient methodology for measuring alignment deviations of the optical segments that can be used in some embodiments of the disclosed technology. Other techniques, including various interferometric and profilometric may also be utilized to carry out the monitoring and measurement operations.

Figure 2A:
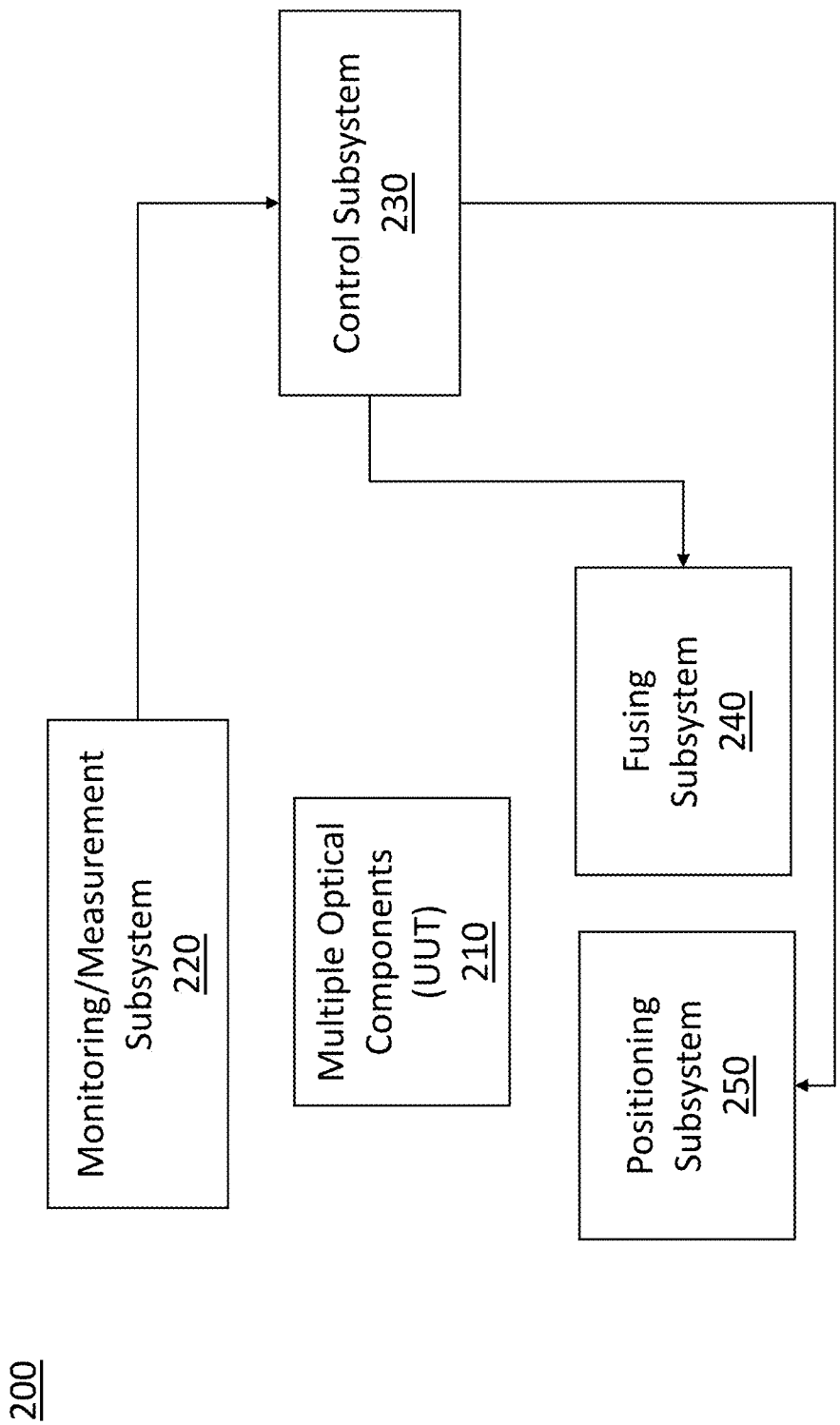
FIG. 2A illustrates various subsystems and their connectivity in an example closed-loop optical segment fusing system in accordance with one or more embodiments.

FIG. 2A illustrates an example system having multiple subsystems that are in communication with each other in accordance with an example embodiment. The system 200 comprises multiple optical segments of an optical component that are positioned to be fused together (UUT 210), a monitoring and measurement subsystem 220, a control subsystem 230, a fusing subsystem 240 and positioning subsystem 250.

The positioning subsystem 250 is configured to position the multiple segments of the optical component to an initial state that conforms to a predetermined alignment or positioning requirement. The positioning subsystem 250 is also configured to adjust the position of one or more of the multiple optical segments, and can include translational and/or rotational stages, stepper motors, transducers, knobs, screws or other means for moving the segments. As a specific example, the positioning subsystem 250 includes a kinematic mount to mount the UUT that includes multiple optical segments. In some embodiments, the positioning of the components can be carried out at least in-part manually.

The fusing subsystem 240 is configured to carry out a fusing process or a fusing technique to attach or fuse the multiple optical segments together. One example fusing technique is based on curing using ultraviolet (UV) radiation; e.g., a UV fusing material (resin) is applied to the interfaces of optical components and illuminated by UV light. The curing process can be halted, slowed down, or sped up in response to the control signals from the control subsystem 230.

The monitoring and measurement subsystem 220 includes components (e.g., a camera) that allows the measurement of one or more characteristics, such as alignment, surface profile, distance, orientation and others, of the UUT, and can use a variety of metrology techniques, which may include deflectometry, interferometry, profilometry and the like. The monitoring and measurement subsystem 220 can monitor positions of one or more of the multiple segments prior to commencement of the fusing process and during the fusing process. The monitoring can be performed continuously or at discrete time intervals. The monitoring and measurement subsystem 220 can include electronic and processing components with various computational capabilities (e.g., to operate as a measuring device), or can merely collect information, such as signals corresponding to images, and provide that information to the control subsystem 230 to process the information.

The control subsystem 230 is configured to receive and process the information from the monitoring and measurement subsystem 220 to determine whether a change in the positions of the multiple segments has occurred that causes a deviation from the initial state within a particular tolerance value of the predetermined alignment or positioning requirement. For example, the tolerance values of an optical design can be ±0.03° in tip/tilt and 25 µm in piston. The control subsystem 230 is also configured to provide control signals to one or both of the fusing and positioning subsystems 240, 250 to adjust, upon a determination that the deviation is not within the particular tolerance value, a position of at least one of the one or more the multiple segments to maintain the deviation within the particular tolerance value. Upon a determination that the deviation is not within the particular tolerance value, the control subsystem can control the fusing subsystem to halt or modify the fusing process to enable adjustment of the position of the at least one of the one or more the multiple segments.

In one specific example, the monitoring/measurement subsystem 220 uses a camera and a display screen with pattern images (e.g., LCD display), similar to the setup illustrated in FIG. 1A, to monitor the positions of the segments. The display is positioned to illuminate the multiple segments. The camera is configured to capture an initial image pattern reflected from the initially aligned multiple segments before the fusing process starts (e.g., based on the initial state of the segments). The camera continues to capture additional images reflected from the multiple segments during the fusing process. The monitoring/measurement subsystem 220 can measure the UUT regardless of time (e.g., continuously or discrete time intervals), space, and number of segments so long as the field of view of the camera covers the entire UUT. If the UUT includes a large number of segments (e.g., more than 10,000 segments), the resolution of the camera needs to be adjusted to be sufficient to cover all the segments.

In the above example, the control subsystem 230 receives the images from the monitoring/measurement subsystem 220 to determine, during the fusing process, whether the positions of the multiple segments have changed based on comparing the additional images captured during the fusing process to the initial image. In some embodiments, the control subsystem 230 receives the images from the monitoring/measurement subsystem 220 and determines if movement of the segments is within a tolerable range. Upon detecting that the positions of the segment drift larger than a tolerance threshold, the control subsystem 230 can control the fusing subsystems 240 to either adjust or stop the fusing process. For example, the fusing process can be paused for either all the segments, or only a subset of the segments where the misalignment was detected. Then, the optical segments can be aligned again either manually (e.g., using one or more knobs) or through an automatic process (e.g., using actuators or other means based on signals from the control subsystem 230). The monitoring/measurement subsystem 220 can continue monitoring the positions of the segments as the positioning subsystem 250 adjusts (e.g., under the control of the control subsystem 230 and/or manually) the positions of the optical segments to determine whether the segments have acquired the proper alignment that conforms to the initial state. Once the segments are re-positioned as expected, the control subsystem 230 can operate the alignment and fusing subsystem 210 to continue the fusing process. The control subsystem 230 can be implemented using a microcontroller (e.g., Arduino) with controlling program code (e.g., MATLAB code, C-code, Assembly code, etc.).

The various subsystems in FIG. 2A are illustrated as separate components to facilitate the understanding of the disclosed techniques. It is, however, understood that some of the depicted components can be combined together, or further broken up into additional subsystems or subcomponents. The disclosed techniques can be applied to reflective surfaces as well as diffusive surface. When the UUT has diffusive surfaces, reflective reference pieces (e.g., small reflective mirrors or tapes) can be mounted onto the surfaces of the UUT. In one example embodiment, the monitoring/measurement subsystem can be setup so that the white light or infrared light is directed at the reference pieces. Images reflected from the reference pieces can be used to determine whether positions of the segments have drifted.

Figure 2B:
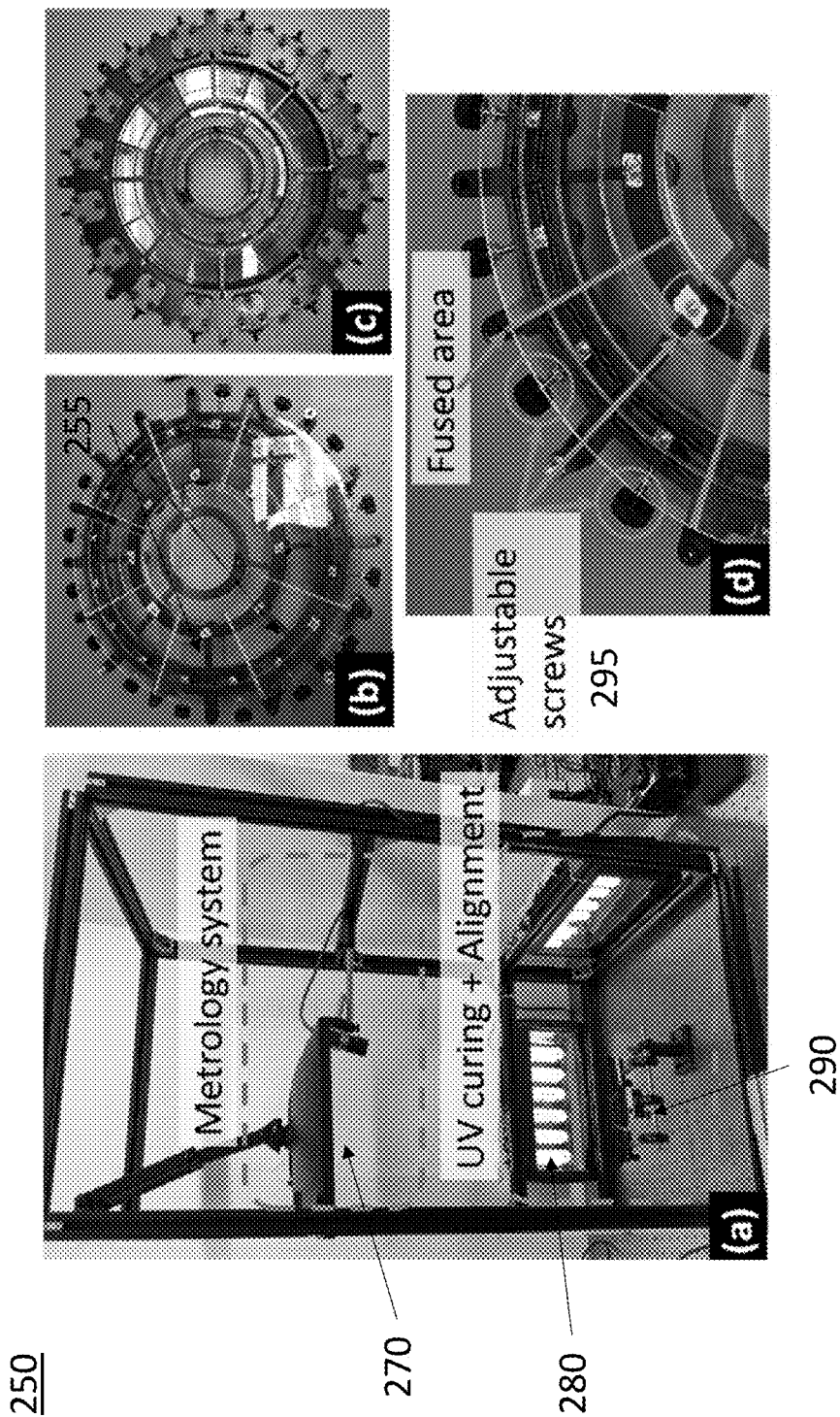
FIG. 2B illustrates an example metrology system in accordance with one or more embodiments.

FIG. 2B illustrates an example metrology system in accordance with one or more embodiments. The metrology system 250 in FIG. 2B includes a monitoring and measuring subsystem 270, a control subsystem (not shown), a fusing subsystem 280 (e.g., UV curing lamp), and a positioning subsystem 290 (e.g., a kinematic mount). The control subsystem is configured to control the monitoring and adjustment of the segmented optics 255. The monitoring and measuring subsystem 270 can perform measurements regardless of time, space, and/or number of segments as long as the camera's field of view covers the entire UUT. The fusing system 280 can also use other fusing mechanisms, such as UV curing, epoxy adhesion, and/or optical welding to fuse optics.

When in operation, the optical segments 255 are positioned under a white light interferometer of the monitoring and measurement system 270 using the positioning subsystem 290 (e.g., a kinematic mount). In this particular example prototype, UV resin is applied at the contact area and left to cure while the optical segments 255 are monitored. In some cases, the intense UV light can saturate the camera sensor. Therefore, the measurement and UV curing can occur periodically (e.g., every 10 sec) to minimize the saturation.

When the metrology system 250 detects a segment position drift that is larger than the designed tolerance, the fusing subsystem 280 (e.g., the UV curing lamp) is turned off and the system terminates the curing process. The system then executes an alignment process again. Alignment can be an automatic process (e.g., actively controlled actuators) or, in some embodiments, a manual process. FIG. 2B illustrates example manually adjustable screws 295 that enable the manual alignment process.

Figure 3:
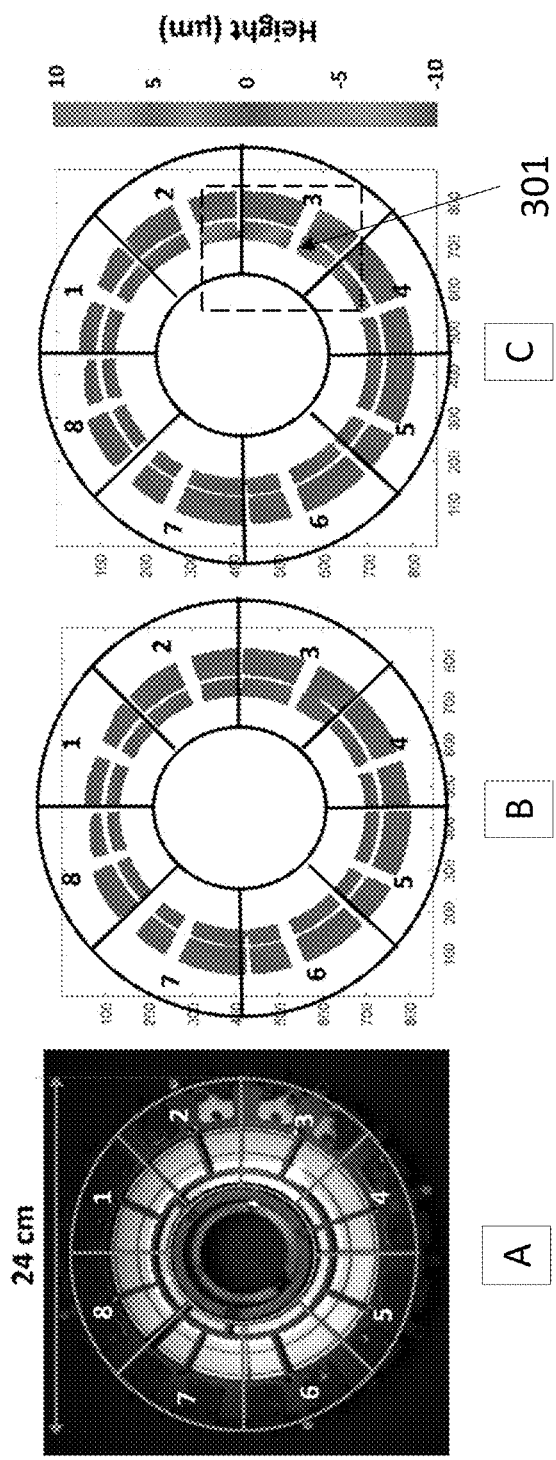
FIG. 3A illustrates real data collected from an example metrology system in accordance with one or more embodiments.
FIG. 3B illustrates example segments observed using an example metrology system in accordance with one or more embodiments.
FIG. 3C illustrates example drift from a reference position of one or more segments in accordance with one or more embodiments.

A prototype lens was fabricated using the example system a shown in FIG. 2B. FIG. 3A illustrates real image data collected from an example metrology system in accordance with an example embodiment. A total of 8 segments were installed in the system. The X and Y axis of depicted in FIGS. 3B and 3C are in pixel unit. All segments were aligned against the initial co-phasing status. The black lines in FIG. 3B represent the actual size of the individual segments. Once the system recorded the reference data, the monitoring iteration started. Without perturbation of position, the segments remained in their initial state, but the #3 segment was tilted by 0.006°. The monitoring data shows the tilted value (e.g., in area 301 of FIG. 3C with a different shading). Because segments #2 and #4 were in contact with segment #3 at the inside border, they also showed the orientation change (e.g., part of the image shows lighter shading areas, or variations in the shading). The required resolution of the segment metrology system is 0.03° in tip/tilt, which was easily detected by this system demonstrating high sensitivity.

Figure 4:
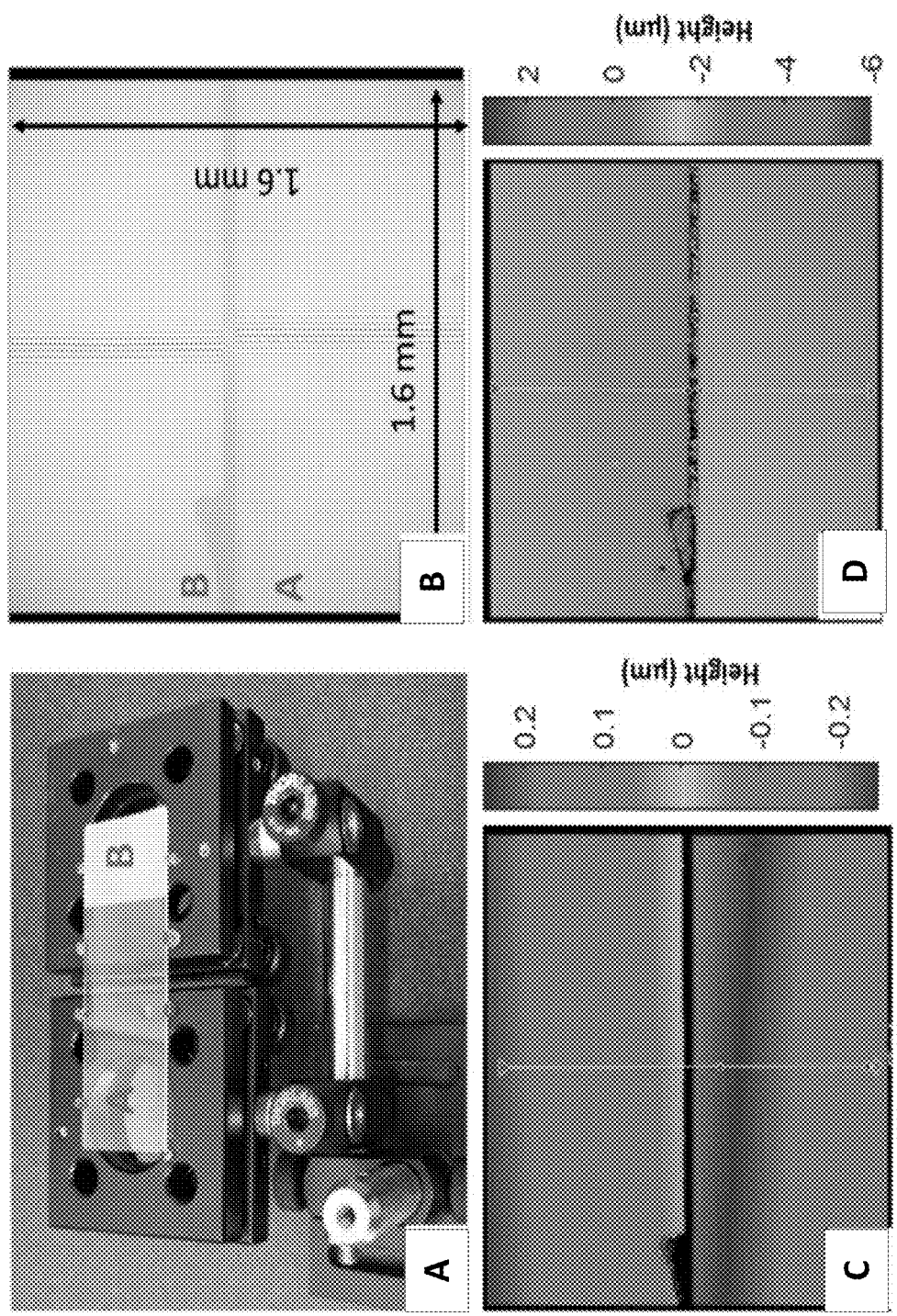
FIG. 4A illustrates example pieces of glasses installed on a kinematic mount.
FIG. 4B illustrates example co-phasing interferogram from a white light interferometer.
FIG. 4C illustrates example three-dimensional (3D) information of the co-phased segments.
FIG. 4D illustrates example 3D information after the curing process.

Two glass dummy samples were used for the validation checks. Two pieces of glass segments were in a co-phased configuration, and the fringe direction and density were used to align the two segments. The UV resin was applied at the contact surface before the UV curing where the metrology system monitored. Once the UV curing was completed, the merged sample is measured to determine if it was in the same initial co-phased state. More specifically, as shown in FIGS. 4A-4D, commercial slide glass was used to create segmented samples (labeled as A and B in FIG. 4A) and positioned on the kinematic mount (also shown in FIG. 4A). Because both mounters initially deviated from the co-phased orientation, an initial visual alignment was performed and the tip-tilt angle was adjusted to produce a continuous interferogram as shown in FIG. 4B. The 3D shape of this status was measured as FIG. 4C. The step height was 470 nm and the angle difference of both segments was less than 0.01°. The tolerances of the optical design were ±0.03° in tip/tilt and 25 μm in the piston. The co-phasing values measured were safely within the tolerance range.

Figure 5:
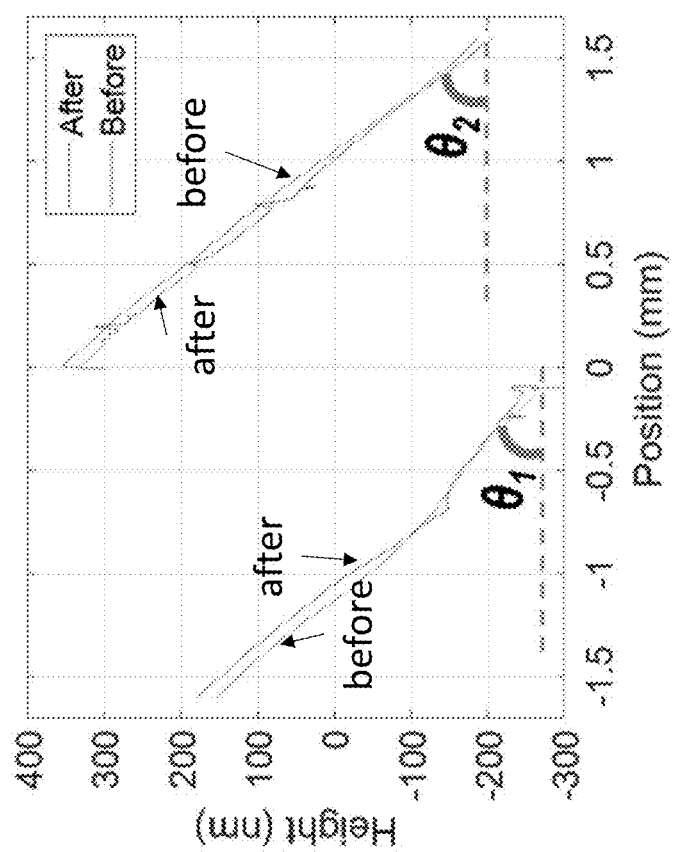
FIG. 5 is an example plot illustrating a lateral profile across the fused area.

UV resin was then applied at the gap (e.g., 60 μm). Then the sample was installed at the UV curing stage for 1 hour while the orientation was continuously monitored. After the resin was fully cured, the residual resin on top of the glass was removed by alcohol. The co-phasing status was measured as shown in FIG. 4D. FIG. 5 is an example plot illustrating a lateral profile across the fused area. Because the two tests measured a slightly different area, the surface shapes were different. However, the angle and step height remained the same. The step height increased by 40 nm, and the relative angle ($|\theta_1 - \theta_2|$) was 0.002°. It is noted that the units in the plot on the x and y-axis are millimeter and nanometer, respectively. The disclosed techniques allow the curing of the segment samples with approximately 0.002° angle and 40 nm piston variation, which is well within the tolerance range of the MODE lens design.

Figure 6:
FIG. 6 is a flowchart representation of a method for assembling an optical element comprising multiple segments in accordance with one or more example embodiments.

FIG. 6 is a flowchart representation of a method for assembling an optical element comprising multiple segments in accordance with an example embodiment. The method 600 includes, at operation 610, aligning multiple segments of an optical element to an initial state. The method 600 includes, at operation 620, directing light from a deflectometry system towards the multiple segments. The method 600 includes, at operation 630, capturing, using a camera, an initial image based on light reflected from the multiple segments. In some embodiments, the method includes positioning the camera with respect to the multiple segments such that a field of view of the camera covers an entirety of the multiple segments of the optical element. In some embodiments, a resolution of the camera is larger than a number of sampling points on the multiple segments of the optical element.

The method 600 includes, at operation 640, initiating a fusing process to fuse the multiple segments of the optical element. The method 600 includes, at operation 650, capturing, using the camera, additional images reflected from the multiple segments during the fusing process. The method 600 includes, at operation 660, determining a change in positions of the multiple segments based on comparing the additional images captured during the fusing process to the initial image. The method 600 also includes, at operation 670, adjusting the fusing process and realigning the multiple segments based on the determining. In some embodiments, adjusting of the fusing process comprises pausing the fusing process for at least a part of the multiple segments. In some embodiments, the fusing process is paused for all the multiple segments of the optical element. In some embodiments, the realigning of the multiple segments comprises automatically realigning, using at least one actuator, the multiple segments according to the initial state. In some embodiments, the realigning of the multiple segments comprises manually realigning the multiple segments according to the initial state.

In some embodiments, an individual segment of the multiple segments has a reflective surface. In some embodiments, an individual segment of the multiple segments has a diffusive surface. One or more reflective reference pieces can be positioned on the optical element to reflect the light from the deflectometer or interferometer. In some embodiments, the fusing process comprises at least one of UV curing, epoxy adhesion, or optical welding.

Figure 7:
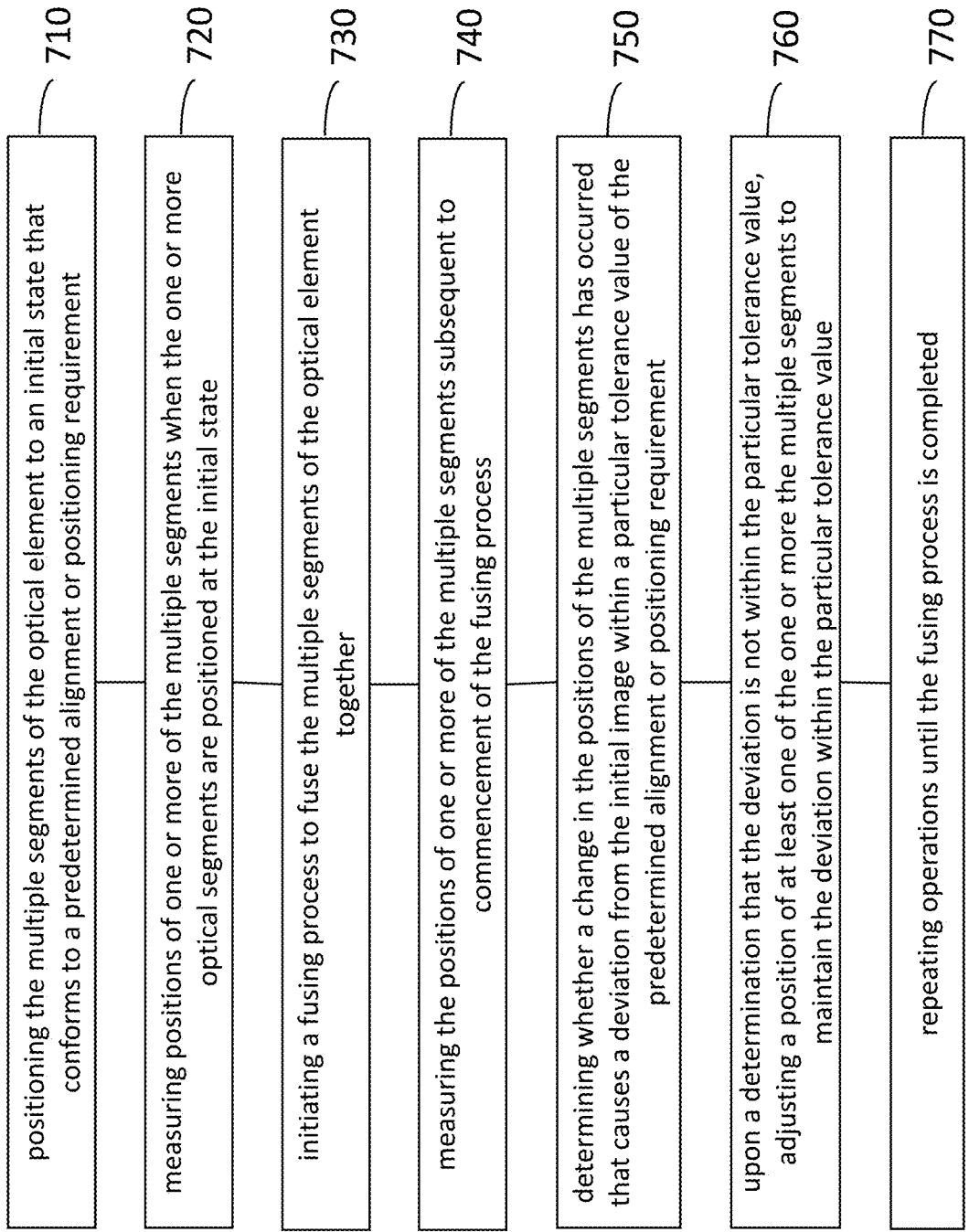
FIG. 7 is a flowchart representation of a method for assembling an optical element comprising multiple segments in accordance with one or more example embodiments.

FIG. 7 is a flowchart representation of a method for assembling an optical element comprising multiple segments in accordance with another example embodiment. The method 700 includes, at operation 710, positioning the multiple segments of the optical element to an initial state that conforms to a predetermined alignment or positioning requirement. The method 700 includes, at operation 720, measuring positions of one or more of the multiple segments when the one or more optical segments are positioned at the initial state. The method 700 includes, at operation 730, initiating a fusing process to fuse the multiple segments of the optical element together. The method 700 includes, at operation 740, measuring the positions of one or more of the multiple segments subsequent to commencement of the fusing process. The method 700 includes, at operation 750, determining whether a change in the positions of the multiple segments has occurred that causes a deviation from the initial state within a particular tolerance value of the predetermined alignment or positioning requirement. The method 700 includes, at operation 760, upon a determination that the deviation is not within the particular tolerance value, adjusting a position of at least one of the one or more the multiple segments to maintain the deviation within the particular tolerance value. The method 700 also includes, at operation 470, repeating operations 740 through 760 until the fusing process is completed.

In some embodiments, upon a determination that the deviation is not within the particular tolerance value, the method includes halting or modifying the fusing process to enable the adjusting. In some embodiments, the measuring in operation 740 is carried out on a continuous basis or at discrete time intervals. In some embodiments, the determining whether or not a change in the positions of the multiple segments has occurred that causes a deviation from the initial state within a particular tolerance value includes determining a variation of an orientation of the one or more segments based on detection of a linearly shifted sinusoidal pattern in captured images by the monitoring and measurement subsystem, and obtaining a title angle using a Fourier transformation. In some embodiments, the measuring in operation 740 is carried out using one of a deflectometric, interferometric, or a profilometric technique.

In some embodiments, measuring the positions of one or more of the multiple segments includes using a camera, and positioning the multiple segments includes placing the multiple segments within a field of view of the camera. In some embodiments, a resolution of the camera is larger than a number of sampling points on the multiple segments of the optical element.

In some embodiments, upon determining that the deviation is not within the particular tolerance value, the method further includes pausing or slowing down the fusing process for only a subset of the segments where the deviation was not within the particular tolerance value, adjusting the position of at least one of segments of the subset of the segments to maintain the deviation within the particular tolerance value, and resuming the fusing process.

In some embodiments, the multiple segments comprise one or both of: at least a reflective segment, or at least a diffusive segment. In some embodiments, the operations 740 through 760 are performed automatically without user interaction. In some embodiments, adjusting the position comprises one or both of: translating or rotating the at least one of the one or more the multiple segments. In some embodiments, a number of the multiple segments is at least eight. In some embodiments, the fusing process comprises at least one of: Ultraviolet (UV) curing, epoxy adhesion, or optical welding.

It will be appreciated that, the disclosed techniques can be used to gather real-time information to guide the precision assembly processes, which requires precise metrology, alignment, and assembly capabilities. System that implement the disclosed techniques can offer a wide dynamic range, multi-object measurement, and high accuracy such that the entire assembly process can be implemented without carrying the UUT for external optical testing.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

It is understood that the various disclosed embodiments may be implemented individually, or collectively, in devices comprised of various optical components, electronics hardware and/or software modules and components. These devices, for example, may comprise a processor, a memory unit, an interface that are communicatively connected to each other, and may range from desktop and/or laptop computers, to mobile devices and the like. The processor and/or controller can perform various disclosed operations based on execution of program code that is stored on a storage medium. The processor and/or controller can, for example, be in communication with at least one memory and with at least one communication unit that enables the exchange of data and information, directly or indirectly, through the communication link with other entities, devices and networks. The communication unit may provide wired and/or wireless communication capabilities in accordance with one or more communication protocols, and therefore it may comprise the proper transmitter/receiver antennas, circuitry and ports, as well as the encoding/decoding capabilities that may be necessary for proper transmission and/or reception of data and other information. For example, the processor may be configured to receive electrical signals or information from the disclosed sensors (e.g., CMOS sensors), and to process the received information to produce images or other information of interest.

Various information and data processing operations described herein may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media that is described in the present application comprises non-transitory storage media. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes Only a few implementations and examples are described and other implementations, enhancements and variations can be made based on what is described and illustrated in this patent document.

What is claimed is:

1. A method for assembling an optical component comprising multiple optical segments, comprising:
   (a) positioning the multiple optical segments of the optical component to an initial state that conforms to a predetermined alignment or positioning requirement;
   (b) measuring positions of one or more of the multiple optical segments when the one or more multiple optical segments are positioned at the initial state;
   (c) initiating a fusing process to fuse the multiple optical segments of the optical component together;

(d) measuring the positions of one or more of the multiple optical segments subsequent to commencement of the fusing process, wherein the measuring includes using a camera with a field of view that captures the positions of all of the multiple optical segments;

(e) determining whether or not a change in the positions of the one or more of the multiple optical segments has occurred that causes a deviation from the initial state within a particular tolerance value of the predetermined alignment or positioning requirement by comparing an initial image obtained by the camera of one or more segments of the optical multiple segments in the initial state captured prior to the commencement of the fusing process to additional images obtained by the camera of the one or more multiple optical segments captured during the fusing process;

(f) upon a determination that the deviation is not within the particular tolerance value, adjusting a position of at least one of the one or more the multiple optical segments to maintain the deviation within the particular tolerance value; and (g) repeating operations (d) through (f) until the fusing process is completed.

2. The method of claim 1, wherein, upon a determination that the deviation is not within the particular tolerance value, the method includes halting the fusing process or modifying the fusing process to enable the adjusting.

3. The method of claim 1, wherein the measuring in operation (d) is carried out on a continuous basis or at discrete time intervals.

4. The method of claim 1, wherein the determining whether or not a change in the positions of the multiple optical segments has occurred that causes a deviation from the initial state within a particular tolerance value includes determining a variation of an orientation of the one or more optical segments based on detection of a linearly shifted sinusoidal pattern in captured images by a monitoring and measurement subsystem, and obtaining a tilt angle using a Fourier transformation.

5. The method of claim 1, wherein the measuring in operation (d) is carried out using one of a deflectometry, interferometry or profilometry technique.

6. The method of claim 1, wherein measuring the positions of one or more of the multiple optical segments includes using a camera, and positioning the multiple optical segments includes placing the multiple optical segments within the field of view of the camera, wherein a resolution of the camera is larger than a number of sampling points on the multiple segments of the optical component.

7. The method of claim 1, wherein, upon determining that the deviation is not within the particular tolerance value, the method further comprises:

pausing or slowing down the fusing process for only a subset of the optical segments where the deviation was not within the particular tolerance value, adjusting the position of at least one of the optical segments of the subset of the optical segments to maintain the deviation within the particular tolerance value, and resuming the fusing process.

8. The method of claim 1, wherein the multiple optical segments comprise: at least a reflective segment, or at least a diffusive segment.

9. The method of claim 1, wherein the operations (d) through (f) are performed automatically without human interaction.

10. The method of claim 1, wherein adjusting the position comprises: translating or rotating the at least one of the one or more the multiple optical segments.

11. The method of claim 1, wherein a number of the multiple optical segments is at least eight.

12. The method of claim 1, wherein the fusing process comprises at least one of: ultraviolet (UV) curing, epoxy adhesion, or optical welding.

\* \* \* \* \*